United States Patent
Chakra et al.

(10) Patent No.: US 9,324,373 B2
(45) Date of Patent: Apr. 26, 2016

(54) DETERMINING UPDATES FOR A VIDEO TUTORIAL

(71) Applicant: International Business Machines Corporation, Armonk, NY (US)

(72) Inventors: Al Chakra, Apex, NC (US); Liam Harpur, Dublin (IE); Vaishnavi Nori, Hyderabad (IN); John Rice, Waterford (IE); Nithinkrishna Shenoy, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 14/085,885

(22) Filed: Nov. 21, 2013

(65) Prior Publication Data

US 2015/0139617 A1    May 21, 2015

(51) Int. Cl.
| | |
|---|---|
| G06F 3/00 | (2006.01) |
| G11B 27/02 | (2006.01) |
| G11B 27/34 | (2006.01) |
| G06F 3/0481 | (2013.01) |
| G09B 7/00 | (2006.01) |

(52) U.S. Cl.
CPC .............. *G11B 27/02* (2013.01); *G06F 3/0481* (2013.01); *G09B 7/00* (2013.01); *G11B 27/34* (2013.01)

(58) Field of Classification Search
CPC ............ H04N 21/252; H04N 21/2387; H04N 21/44222; H04N 21/4758; G06F 3/0481
USPC .................. 386/248, 281, 282, 287, 289–290; 715/751, 753, 708
See application file for complete search history.

(56) References Cited

U.S. PATENT DOCUMENTS

| | | |
|---|---|---|
| 7,878,808 B1 | 2/2011 | Stumm et al. |
| 7,908,588 B2 | 3/2011 | Charboneau et al. |
| 7,979,801 B2 | 7/2011 | Krishnaswamy et al. |
| 8,230,343 B2 | 7/2012 | Logan et al. |
| 2002/0031756 A1 | 3/2002 | Holtz et al. |
| 2002/0116716 A1 | 8/2002 | Sideman |
| 2012/0054644 A1* | 3/2012 | Venkataraman ....... G06Q 50/20 715/753 |

(Continued)

OTHER PUBLICATIONS

Lafreniere, B. et al. "Community Enhanced Tutorials: Improving Tutorials with Multiple Demonstrations". CHI 2013, Apr. 27-May 2, 2013. France. Copyright 2013.

(Continued)

*Primary Examiner* — Helen Shibru
(74) *Attorney, Agent, or Firm* — Daniel R. Simek

(57) ABSTRACT

Embodiments of the present invention disclose a computer implemented method, computer program product, and system for updating a video tutorial. In accordance with an embodiment, the method includes the steps of determining a number of users of a video tutorial that have performed a set of actions that are different than a set of actions displayed in the video tutorial, determining that the number of users of the video tutorial that have performed the set of actions that are different meets a threshold condition, and identifying a segment of the video tutorial to remove, wherein the identified segment includes the set of actions displayed in the video tutorial that are different. The method may further include creating an updated video tutorial by replacing the identified segment of the video tutorial with a video of the set of actions that are different than the set of displayed actions.

13 Claims, 4 Drawing Sheets

(56) References Cited

U.S. PATENT DOCUMENTS

| | | |
|---|---|---|
| 2012/0096337 A1 | 4/2012 | White |
| 2012/0137317 A1* | 5/2012 | Elizarov et al. ............... 725/13 |
| 2013/0129316 A1 | 5/2013 | Dontcheva et al. |
| 2014/0279688 A1* | 9/2014 | Ginsberg ............... G06Q 40/06 705/36 R |
| 2014/0310596 A1* | 10/2014 | Lafreniere ............... G09B 5/00 715/708 |
| 2014/0344178 A1* | 11/2014 | Kapoor ............... G09B 7/02 705/326 |

OTHER PUBLICATIONS

Pongnumkul, S. et al. "Pause-and-Play: Automatically Linking Screencast Video Tutorials with Applications". UIST 2011, Oct. 16-19, 2011. USA. Copyright 2011.

"Link Tutorial Video to Source Control". An IP.com Prior Art Database Technical Disclosure. IP.com No. IPCOM000221938D. IP.com Electronic Publication: Sep. 17, 2012.

U.S. Appl. No. 14/315,469. Entitled "Determining Updates for a Video Tutorial", Filed Jun. 26, 2014.

* cited by examiner

DETERMINING UPDATES FOR A VIDEO TUTORIAL

FIELD OF THE INVENTION

The present invention relates generally to the field of tutorials, and more particularly to updating a video tutorial.

BACKGROUND OF THE INVENTION

A tutorial is a method of transferring knowledge, which may be used as part of a learning process. Depending on context, a tutorial can be in a variety of different forms, including a set of instructions to complete a task, and an interactive problem solving session. A video tutorial is a video that describes a series of actions or steps that need to be completed in order to make use of a certain functionality of a product or an application. Computer-based video tutorials can depict actions to be performed, and then have an interactive portion where a user performs the function outlined in the video tutorial. In an example, in the case of image editing software, a video tutorial exists depicting how to use the gray scaling feature. The video tutorial includes instructions for launching the image editing software, selecting the gray scaling feature in the software menu, and performing gray scaling on a sample image. The video tutorial can include each step and action (e.g., mouse click) required to perform the function. After viewing the video tutorial, the user can perform the depicted function in the interactive portion of the tutorial to ensure that the user has learned how to properly utilize the function.

SUMMARY

Embodiments of the present invention disclose a computer implemented method, computer program product, and system for updating a video tutorial. In one embodiment, in accordance with the present invention, the computer implemented method includes the steps of determining a number of users of a video tutorial that have performed a set of actions that are different than a set of actions displayed in the video tutorial, determining that the number of users of the video tutorial that have performed the set of actions that are different than the set of actions displayed in the video tutorial meets a threshold condition, and responsive to determining that the threshold condition is met, identifying a segment of the video tutorial to remove, wherein the identified segment includes the set of actions displayed in the video tutorial that are different. An updated video tutorial is created by replacing the identified segment of the video tutorial with a video of the set of actions that are different than the set of actions displayed in the video tutorial.

DETAILED DESCRIPTION

Figure 1:
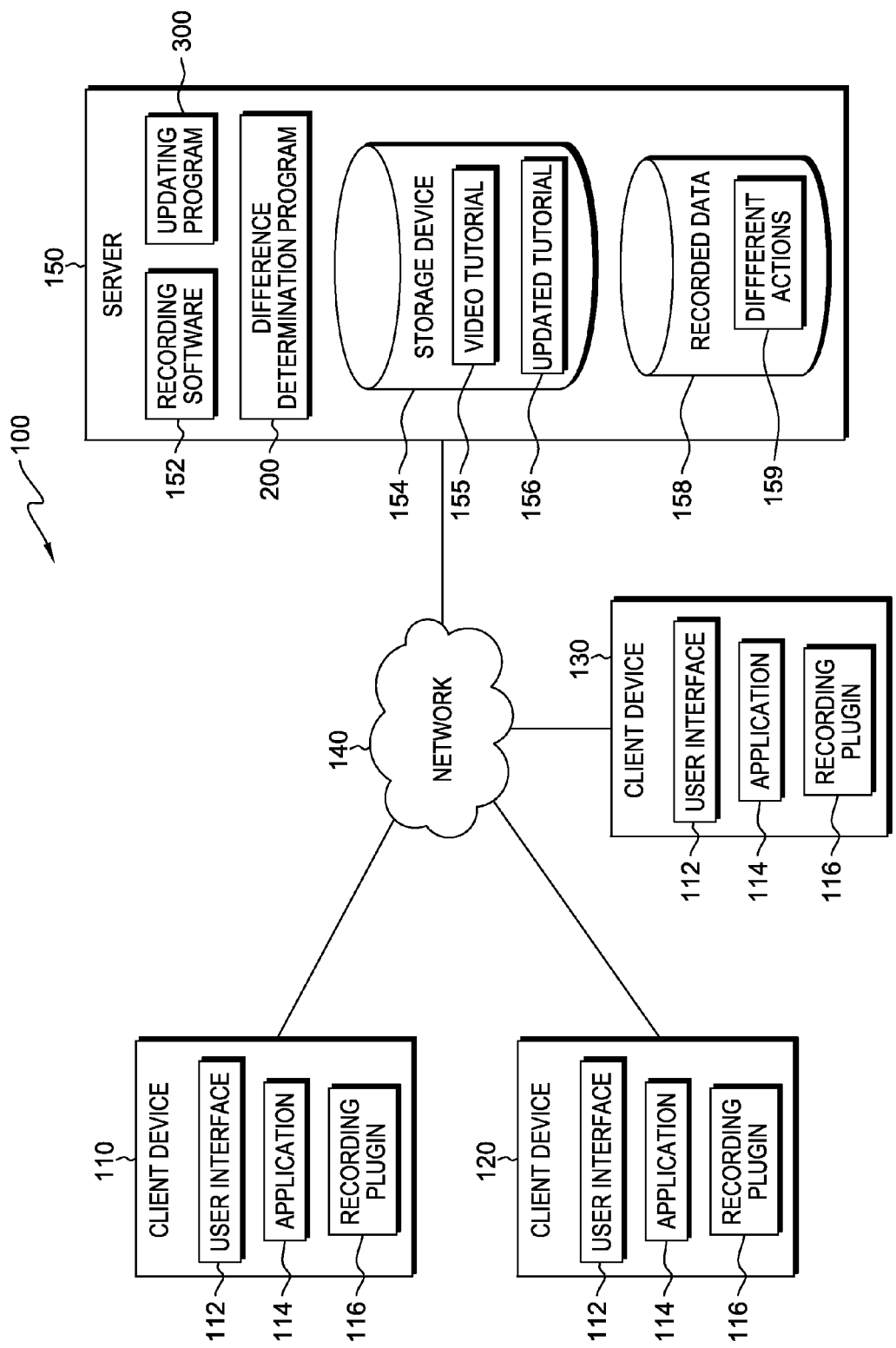
FIG. 1 is a functional block diagram of a data processing environment in accordance with an embodiment of the present invention.

Embodiments of the present invention allow for updating a video tutorial based on information gathered from users of the tutorial. In one embodiment, after a video tutorial is displayed, actions of a user corresponding to the video tutorial are recorded. If differences exist between the actions displayed in the video tutorial and the recorded actions of the user, then the video tutorial can be updated.

Embodiments of the present invention recognize that steps or actions depicted in a video tutorial may be out of date, or a better way of carrying out the steps or actions may exist. Providing video tutorials with the most efficient and up to date actions and steps can improve the quality and effectiveness of learning provided by video tutorials.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer or other programmable apparatus, provide processes for implementing the functions/acts specified in the flowchart and/or block diagram block or blocks.

The present invention will now be described in detail with reference to the Figures. FIG. 1 is functional block diagram illustrating data processing environment 100, in accordance with one embodiment of the present invention.

An embodiment of data processing environment 100 includes client devices 110, 120 and 130, and server 150, all interconnected over network 140. Client devices 110, 120 and 130 can access documents and data (e.g., video tutorial 155, updated tutorial 156), on server 150. In various embodiments of the present invention, client devices 110, 120 and 130 may be workstations, personal computers, personal digital assistants, mobile phones, or any other devices capable of executing program instructions in accordance with embodiments of the present invention. In general, client devices 110, 120 and 130 are representative of any electronic device or combination of electronic devices capable of executing machine-readable program instructions, as described in greater detail with regard to FIG. 5, in accordance with embodiments of the present invention.

Client devices 110, 120 and 130 include respective instances of user interface 112, application 114, and recording plugin 116. User interface 112 accepts input from individuals utilizing client devices 110, 120 and 130. Application 114 can be utilized to access data (e.g., video tutorial 155, updated tutorial 156), stored on server 150. In example embodiments, application 114 receives input from user interface 112, which may be provided by an individual utilizing client devices 110, 120 or 130. In an example, application 114 can be a web browser or other software application that client devices 110, 120 and 130 can utilize to view video tutorial 155, and then perform the actions depicted in video tutorial 155. Recording plugin 116 can record actions of client devices 110, 120 and 130 on application 114. In one embodiment, recording plugin 116 is associated with application 114, and can record actions performed in application 114. For example, after viewing video tutorial 155, client device 110, 120 or 130 utilizes application 114 to perform the actions depicted in video tutorial 155. Recording plugin 116 records the performed actions, and sends the recorded actions to server 150.

In one embodiment, client devices 110, 120 and 130, and server 150 communicate through network 140. Network 140 can be, for example, a local area network (LAN), a telecommunications network, a wide area network (WAN) such as the Internet, or a combination of the three, and include wired, wireless, or fiber optic connections. In general, network 140 can be any combination of connections and protocols that will support communications between client devices 110, 120 and 130, and server 150 in accordance with embodiments of the present invention.

In one embodiment, server 150 can be any type of server that hosts and provides documents, tutorials, and videos to client devices 110, 120 and 130. In example embodiments, server 150 can be a desktop computer, computer server, or any other computer system known in the art capable of performing functions in accordance with embodiments of the present invention. In certain embodiments, server 150 represents computer systems utilizing clustered computers and components (e.g., database server computers, application server computers, etc.), that act as a single pool of seamless resources when accessed by elements of data processing environment 100 (e.g., client devices 110, 120 and 130). In general, server 150 is representative of any electronic device or combination of electronic devices capable of executing machine-readable program instructions, as described in greater detail with regard to FIG. 5, in accordance with embodiments of the present invention.

Server 150 includes recording software 152, storage device 154, recorded data 158, difference determination program 200, and updating program 300. In one embodiment, recording software 152 is associated with instances of recording plugin 116 on client device 110, 120 and 130, and receives recorded data corresponding to client devices 110, 120 and 130 from respective instances of recording plugin 116. Recording software 152 stores received recorded data from recording plugin 116 in recorded data 158, and associates the stored data with a corresponding video tutorial 155.

Storage device 154 includes one or more instances of video tutorial 155, and updated tutorial 156. In one embodiment, storage device 154 includes metadata associated with instances of video tutorial 155 and updated tutorial 156. The metadata indicates the actions performed and depicted in video tutorial 155 and updated tutorial 156 (e.g., mouse clicks, text inputs, etc.). Video tutorial 155 is a video describing a series of actions or steps that need to be completed in order to make use of a certain functionality of a product or an application. For example, video tutorial 155 is a tutorial providing instruction on how to utilize a search engine. Updated tutorial 156 is an updated version of video tutorial 155, which has been created by updating program 300 (discussed in further detail with regard to FIG. 3), utilizing crowd sourced data (e.g., from client devices 110, 120 and 130). Each instance of updated tutorial 156 is associated with the corresponding instance of video tutorial 155. In example embodiments, client devices 110, 120 and 130 can access and view video tutorial 155 and updated tutorial 156 via network 140. When accessing tutorials on server 150, client devices 110, 120 and 130 can choose to view video tutorial 155 or video tutorial 156.

In one embodiment, recorded data 158 includes one or more instances of different actions 159. Recorded data 158 stores data recorded by recording plugin 116 on client devices 110, 120 and 130, and sends to recording software 152. For example, client device 110 views video tutorial 155 and performs actions on application 114 corresponding to video tutorial 155. Recording plugin 116 records the actions performed in application 114 and sends the recorded actions to recording software 152, which stores the recorded action on recorded data 158 along with an association to video tutorial 155. Different action 159 includes data corresponding to recorded actions stored in recorded data 158 that are different than the actions performed in the associated video tutorial 155. Determining different actions 159 is discussed with regard to FIG. 2, and utilizing determined actions 159 is discussed with regard to FIG. 3.

Storage device 154 and recorded data 158 can be implemented with any type of storage device, for example, persistent storage 508, which is capable of storing data that may be accessed and utilized by client devices 110, 120 and 130, and server 150 such as a database server, a hard disk drive, or flash memory. In other embodiments, storage device 154 and recorded data 158 can represent multiple storage devices within server 150. In example embodiments, difference determination program 200 determines differences between actions of client devices 110, 120 and 130 and actions depicted in a video tutorial, in accordance with embodiments of the present invention. In example embodiments, updating program 300 updates a video tutorial in a manner generally corresponding to differences determined in difference determination program 200, in accordance with embodiments of the present invention.

Figure 2:
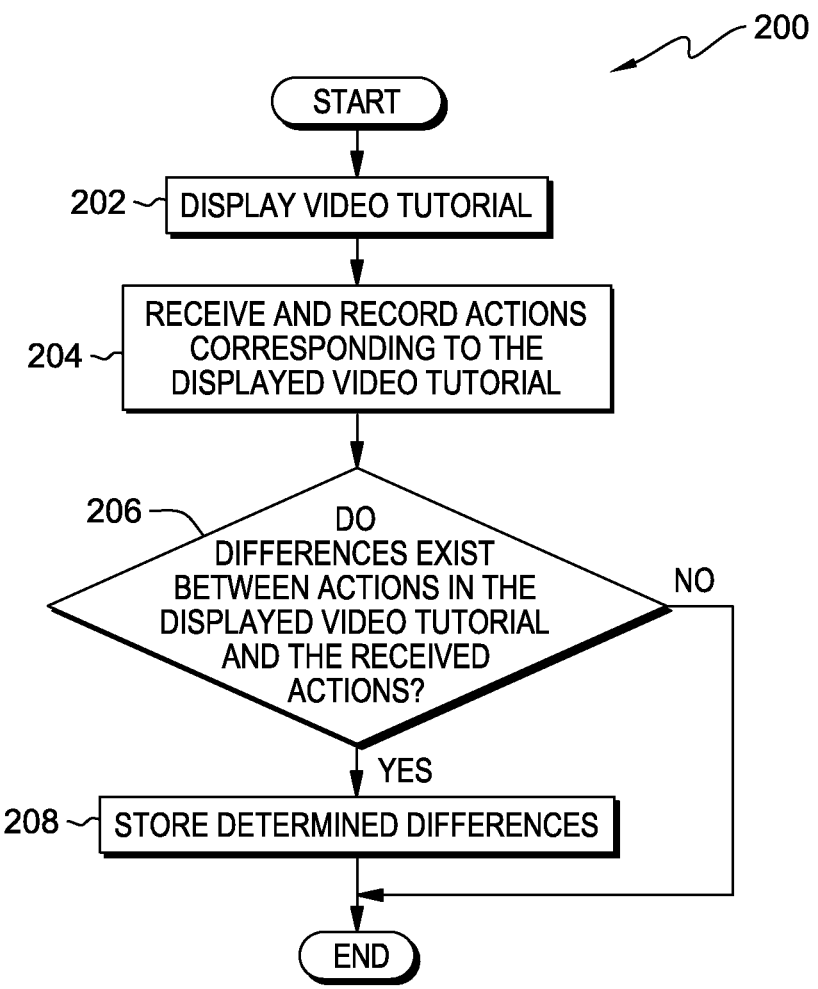
FIG. 2 is a flowchart depicting operational steps of a program for determining differences between actions of users of a video tutorial and actions depicted in the video tutorial, in accordance with an embodiment of the present invention.

FIG. 2 is a flowchart depicting operational steps of difference determination program 200 in accordance with an embodiment of the present invention. In one embodiment, difference determination program 200 initiates responsive to server 150 receiving a request to view video tutorial 155 from a client device (e.g., client device 110, 120 or 130) that includes an instance of recording plugin 116 that is configured to record actions performed on application 114 (e.g., a user the client device has given recording plugin 116 permission to record actions).

Figure 4:
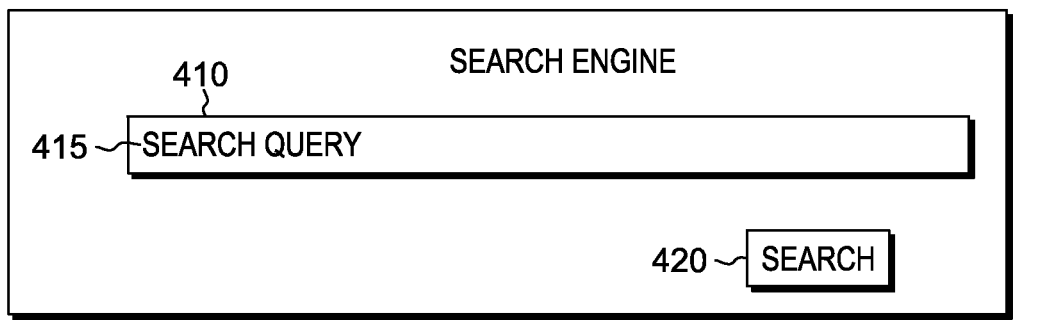
FIG. 4 illustrates an interface for a sample video tutorial depicting how to utilize a search engine, in accordance with an embodiment of the present invention.

Difference determination program 200 displays the video tutorial (step 202). In one embodiment, difference determination program 200 displays video tutorial 155 to one or more of client device 110, 120 or 130. Video tutorial 155 includes metadata that indicates the actions performed in the tutorial and the instant in time the actions are performed. For example, the metadata indicates that at 2:15 of video tutorial 155 the action of "click search button" is performed. In an example, with regard to FIG. 4, video tutorial 155 depicts instructions for utilizing a search engine. FIG. 4 illustrates sample search engine tutorial 400, which includes text field 410, search query 415, and search button 420. In this example, video tutorial 155 depicts the actions of utilizing the mouse to select text field 410, entering search query 415 into text field 410, and utilizing the mouse to select search button 420.

Difference determination program 200 then receives and records actions corresponding to the displayed video tutorial (step 204). In one embodiment, in response to viewing video tutorial 155 (displayed in step 202), client devices 110, 120 and 130 can perform the actions depicted in video tutorial 155 utilizing application 114 (e.g., in an interactive or hands-on portion of video tutorial 155). In an embodiment, actions are input into application 114 on client devices 110, 120 and 130 via user interface 112, and recorded by recording plugin 116. Difference determination program 200 receives the recorded actions from recording plugin 116, and stores the recorded actions on recorded data 158 along with tagged metadata corresponding to the recorded actions. In various embodiments, metadata that is associated with recorded actions is stored in recorded data 158 and is in the same format as metadata that is associated with video tutorial 155 (e.g., a standard formatting).

In the previously discussed example with regard to FIG. 4, difference determination program 200 displays video tutorial 155 to client device 110 (step 202). After viewing video tutorial 155, client device 110, in response to input from a user into user interface 112, performs the actions depicted in video tutorial 155 in application 114 (e.g., a web browser), and difference determination program 200 utilizes recording plugin 116 to record the actions. In this example, instead of performing the search in application 114 using actions exactly as depicted in video tutorial 155 (utilizing the mouse to select text field 410, entering search query 415 into text field 410, and utilizing the mouse to select search button 420), client device 110 presses the enter key instead of utilizing the mouse to select search button 420, and achieves the same result. Difference determination program 200 then stores the recorded actions (received from recording plugin 116), in recorded data 158, and the data is associated with video tutorial 155. In example embodiments, metadata associated with recorded actions is converted to the same metadata format of the corresponding instance of video tutorial 155.

Difference determination program 200 then determines whether differences exist between actions in the displayed video tutorial and the recorded actions (decision step 206). In one embodiment, difference determination program 200 compares metadata of the recorded actions (from step 204) to metadata associated with video tutorial 155 to determine whether differences exist between actions displayed in video tutorial 155 and the recorded actions. For example, if a set of actions performed by client devices 110, 120 or 130 is different than a set of actions depicted in video tutorial 155, which corresponds to performing the same function, then difference determination program 200 determines that differences exist between actions in the displayed video tutorial and the recorded actions. In the previously discussed example with regard to FIG. 4, the metadata associated with video tutorial 155 (depicting how to utilize a search engine), includes the following sample metadata:

2:00:10 Click TextField_SearchEngine
2:00:12 Input Text TextField_SearchEngine Search Query
2:00:15 Click SearchButton_SearchEngine In this example, the stored recorded actions in recorded data 158 that correspond to client device 110 and video tutorial 155 include the following sample metadata:

2:00:10 Click TextField_SearchEngine
2:00:12 Input Text TextField_SearchEngine Search Query{ENTER}

In this example, difference determination program 200 compares the metadata associated with video tutorial 155 to the metadata of the stored recorded actions of client device 110. Difference determination program 200 determines that differences do exist, because client device 110 used the "ENTER" keystroke instead of clicking on search button 420.

Difference determination program 200 then stores the determined differences (step 208). In one embodiment, responsive to determining that at least one difference does exist (decision step 206, "yes" branch), difference determination program 200 stores the determined differences in recorded data 158 and different actions 159. In the previously discussed example with regard to FIG. 4, difference determination program 200 determined different actions 159 of client device 110 using the "ENTER" keystroke instead of clicking on search button 420. In this example, difference determination program 200 stores an instance of different actions 159 that includes using the "ENTER" keystroke instead of clicking on search button 420, associated with video tutorial 155 and client device 110. In another embodiment, the stored instance of different actions 159 is associated with other instances of different actions 159 in recorded data 158 that correspond to video tutorial 155.

Figure 3:
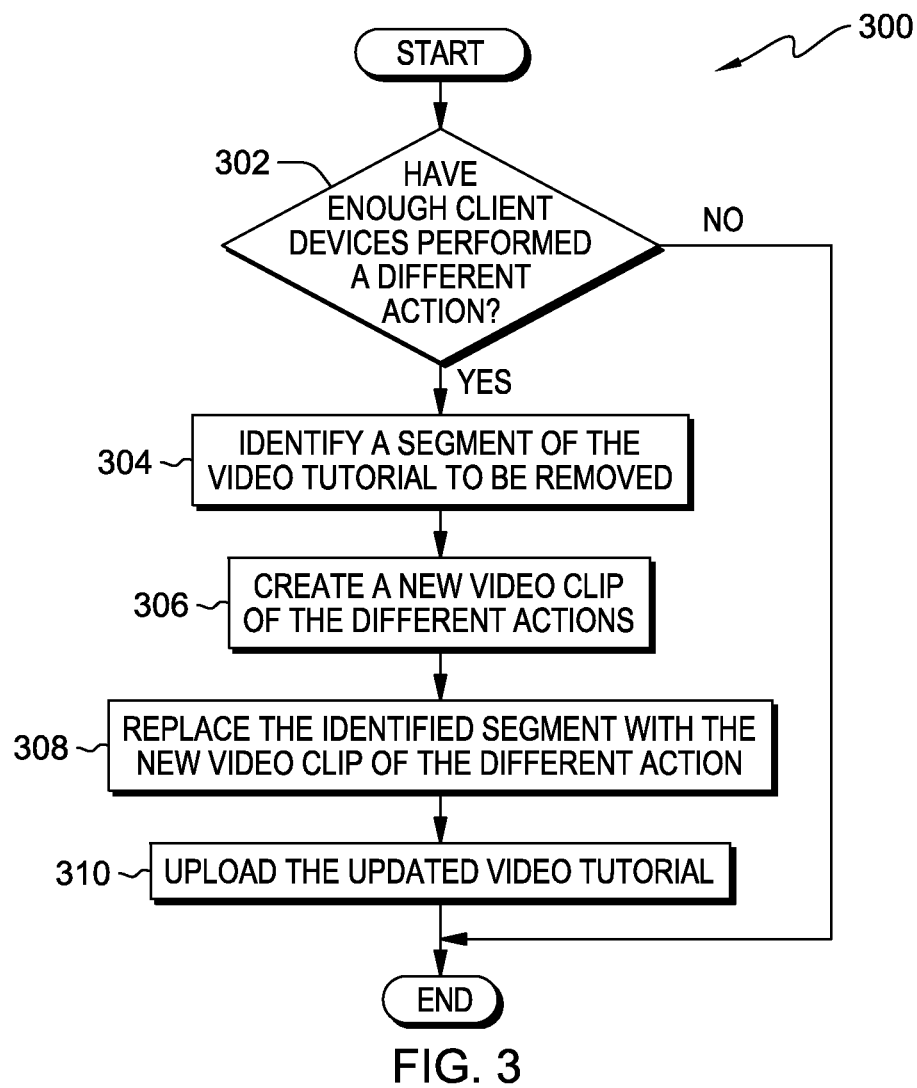
FIG. 3 is a flowchart depicting operational steps of a program for updating a video tutorial based on determined differences (from FIG. 2), in accordance with an embodiment of the present invention.

FIG. 3 is a flowchart depicting operational steps of updating program 300 in accordance with an embodiment of the present invention. In one embodiment, updating program 300 initiates responsive to an instance of different actions 159 being stored on recorded data 158 (difference determination program 200, step 208).

Updating program 300 determines whether enough client devices have performed a different action (decision step 302). In one embodiment, updating program 300 utilizes instances of different actions 159 in recorded data 158 that are associated with video tutorial 155 to determine whether enough users (e.g., a minimum number of client devices 110, 120 and 130), have performed different actions than the actions that are depicted in video tutorial 155. Metadata, stored in recorded data 158 and associated with different actions 159 and video tutorial 155, includes an indication of a number of users of the video tutorial (e.g., client devices 110, 120 and 130), that have performed different actions 159 relative to the total number of users that have viewed video tutorial 155. In example embodiments, updating program 300 utilizes different actions 159 to determine whether a defined number of users (e.g., client device 110, 120 and 130), have performed the same set of actions instead of the actions depicted in video tutorial 155. For example, the defined number of users can be a customizable threshold percentage (e.g., more than 60% of users), a majority of users (i.e., more than 50%), or a defined quantity of users (e.g., more than 45 users).

In another embodiment, an individual associated with server 150 (e.g., a system administrator), can provide a manual indication to updating program 300 that indicates whether or not enough client devices have performed a different action. In one example, even if the number of users that have performed different actions 159 does not exceed the defined threshold condition, a system administrator of server 150 can indicate to updating program 300 that enough users have performed different actions 159. In another example, if updating program 300 determines that enough users have performed different action 159, but a system administrator of server 150 thinks that the actions of different actions 159 are not as efficient as the actions depicted in video tutorial 155, the system administrator can provide an indication to updating program 300 that not enough users have performed different actions 159.

Updating program 300 then identifies a segment of the video tutorial to be removed (step 304). In one embodiment, responsive to determining that enough client devices have performed different actions 159 (decision step 302 "yes" branch), updating program 300 identifies the segment of video tutorial 155 that corresponds to the set of actions to be removed. Updating program 300 utilizes metadata associated with video tutorial 155 and different actions 159 to identify the time interval of the segment of video tutorial 155 to be removed. The segment of video tutorial 155 to be removed corresponds to the difference in the metadata between video tutorial 155 and different actions 159.

In the previously discussed example with regard to FIG. 3, difference determination program 200 determined different actions 159 corresponding to video tutorial 155 to be using the "ENTER" keystroke instead of clicking on search button 420. In step 302, updating program 300 determined that enough client devices have performed different actions 159 instead of the actions depicted in video tutorial 155. In this example, updating program 300 utilizes the metadata associated with video tutorial 155 to identify the time interval in video tutorial 155 that corresponds to clicking on search button 420 instead of using the "ENTER" keystroke. Updating program 300 identifies the segment including the actions at the times of 2:00:12 (Input Text TextField_SearchEngine Search Query) and 2:00:15 (Click SearchButton_SearchEngine) as the segment of video tutorial 155 to be removed.

Updating program 300 then creates a new video clip of the different actions (step 306). In one embodiment, updating program 300 creates a new video clip of the actions depicted in different actions 159. Updating program 300 utilizes the recorded actions of different actions 159 (stored in recorded data 158) to create the new video clip. For example, recording plugin 116, recorded client device 110 performing different actions 159, and updating program 300 utilizes the recorded actions of different actions 159 to create a video clip. In the previously discussed example with regard to FIG. 3, different actions 159 include using the "ENTER" keystroke instead of clicking on search button 420. Updating program 300 utilizes the metadata associated with recorded actions (from client device 110) in different actions 159 to determine the time interval corresponding to different actions 159 to determine the segment of different actions 159 to record and utilize in the creation of the new video clip. In this example, updating program 300 created a new video clip depicting using the "ENTER" keystroke instead of clicking on search button 420 (indicated by the metadata: 2:00:12 Input Text TextField_SearchEngine Search Query{ENTER}).

Updating program 300 then replaces the identified segment with the new video clip of the different action (step 308). In one embodiment, updating program 300 replaces the segment of video tutorial 155, identified in step 304, with the new video clip of the different actions 159 created in step 308. In the previously discussed example with regard to FIG. 4, updating program 300 removes the video frames in the time interval of the segment of video tutorial 155 to be removed (identified in step 304). Then updating program 300 inserts the video clip of different actions 159 (created in step 306) in the place of the removed video frames. In this example, updating program 300 creates updated tutorial 156, which is an updated version of video tutorial 155. Updated tutorial 156 depicts using the "ENTER" keystroke instead of clicking on search button 420.

Updating program 300 then uploads the updated video tutorial (step 310). In one embodiment, updating program 300 stores updated tutorial 156, which is an updated version of video tutorial 155, in storage device 154 (e.g., a storage location of video tutorial 155). Updated tutorial 156 is available to be chosen as a replacement for video tutorial 155 (e.g., by client devices 110, 120 and 130, an administrator associated with server 150). In example embodiments, updating program 300 stores updated tutorial 156 with updated metadata corresponding to the actions currently displayed in updated tutorial 156. For example, metadata corresponding to updated tutorial 156 depicting using the "ENTER" keystroke instead of clicking on search button 420 can be:

2:00:10 Click TextField_SearchEngine

2:00:12 Input Text TextField_SearchEngine Search Query{ENTER}

FIG. 4 illustrates sample search engine tutorial 400, which includes text field 410, search query 415, and search button 420. In example embodiments, video tutorial 155 depicts the actions of utilizing the mouse to select text field 410, entering search query 415 into text field 410, and utilizing the mouse to select search button 420. Updating program 300 creates the corresponding instance of updated tutorial 156 to video tutorial 155 based on crowd sourced actions received from client device 110, 120 and 130, which includes using the "ENTER" keystroke instead of clicking on search button 420.

Figure 5:
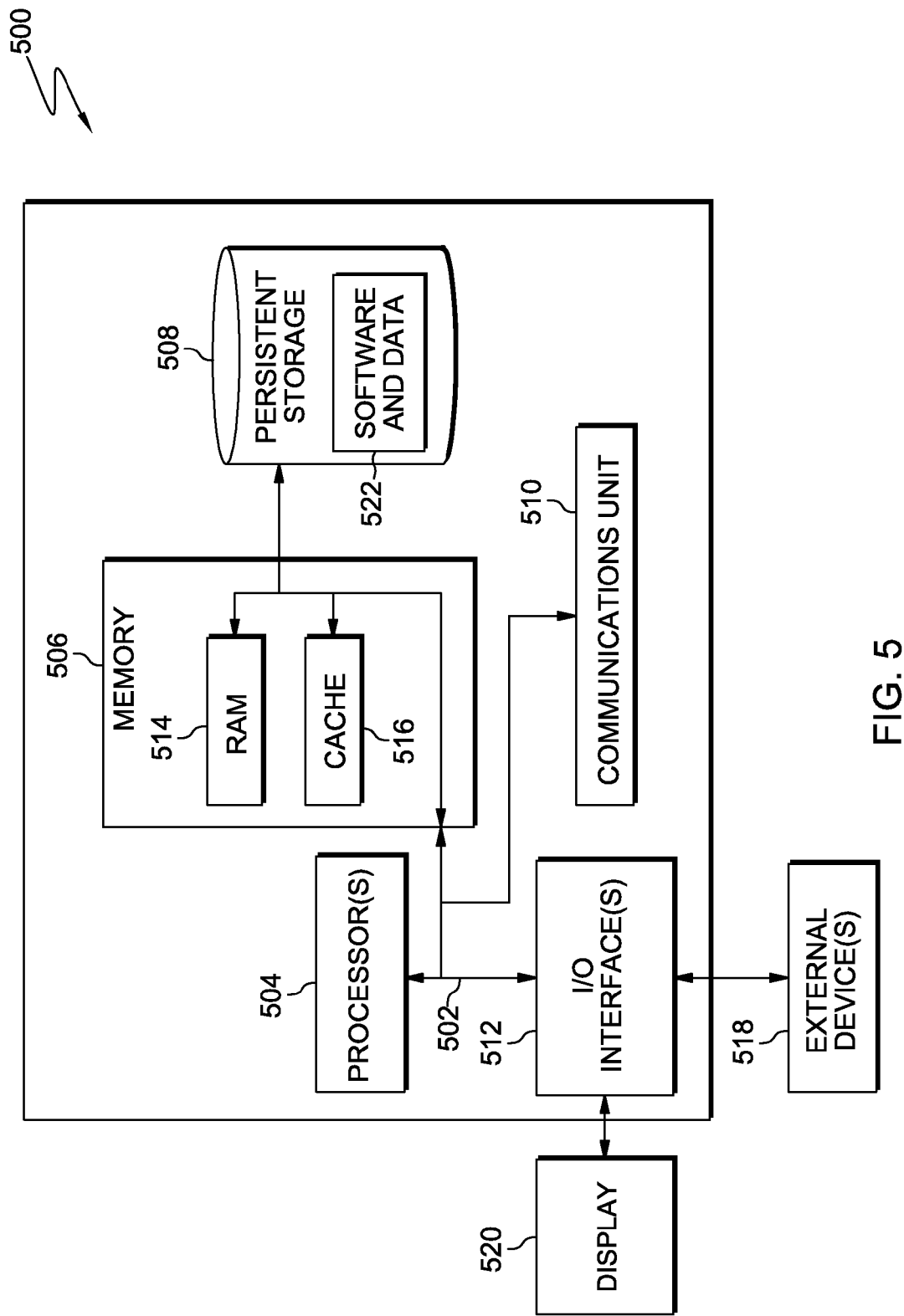
FIG. 5 depicts a block diagram of components of the computing system of FIG. 1 in accordance with an embodiment of the present invention.

FIG. 5 depicts a block diagram of components computer 500, which is representative of client devices 110, 120 and 130, and server 150 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media. Software and data 522 are stored in persistent storage 508 for access and/or execution by processors 504 via one or more memories of memory 506. With respect to client devices 110, 120 and 130, software and data 522 represent application 114 and recording plugin 116. With respect to server 150, software and data 522 represent recording software 152, difference determination program 200, updating program 300, video tutorial 155, updated tutorial 156, recorded data 158, and different actions 159.

In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices. In these examples, communications unit 510 may include one or more network interface cards. Communications unit 510 may provide communications through the use of either or both physical and wireless communications links. Software and data 522 may be downloaded to persistent storage 508 through communications unit 510.

I/O interface(s) 512 allows for input and output of data with other devices that may be connected to computer 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data 522 can be stored on such portable computer-readable storage media and can be loaded onto persistent storage 508 via I/O interface(s) 512. I/O interface(s) 512 also can connect to a display 520.

Display 520 provides a mechanism to display data to a user and may be, for example, a computer monitor. Display 520 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for updating a video tutorial, the computer program product comprising:
   one or more computer readable storage devices and program instructions stored on the one or more computer readable storage devices, the program instructions comprising:
   program instructions to determine a number of users of a video tutorial that have performed a set of actions that are different than a set of actions displayed in the video tutorial;
   program instructions to determine that the number of users of the video tutorial that have performed the set of actions that are different than the set of actions displayed in the video tutorial meets a threshold condition;

responsive to determining that the threshold condition is met, program instructions to identify a segment of the video tutorial to remove, wherein the identified segment includes the set of actions displayed in the video tutorial that are different; and program instructions to create an updated video tutorial by replacing the identified segment of the video tutorial with a video of the set of actions that are different than the set of actions displayed in the video tutorial.

2. The computer program product in accordance with claim 1, wherein the program instructions to determine the number of users of the video tutorial that have performed the set of actions that are different than the set of actions displayed in the video tutorial further comprises program instructions to:

receive actions performed by users of the video tutorial corresponding to actions displayed in the video tutorial, wherein the actions performed by the users of the video tutorial are being performed in response to viewing the video tutorial; and determine that the received actions include a set of actions that are different than a set of actions in the video tutorial, wherein the actions performed by the users of the video tutorial are recorded and stored with an association to the video tutorial.

3. The computer program product in accordance with claim 1, wherein the performed set of actions and the set of actions displayed in the video tutorial correspond to performing the same function depicted in the video tutorial.

4. The computer program product in accordance with claim 1, wherein program instructions to create the updated video tutorial by replacing the identified segment of the video tutorial with the video of the set of actions that are different than the set of actions displayed in the video tutorial further comprises program instructions to:

create a video clip of the performed set of actions that are different than the set of actions displayed in the video tutorial;

remove the identified segment of the video tutorial; and insert the created video clip into the video tutorial in place of the removed segment of the video tutorial.

5. The computer program product in accordance with claim 1, further comprising program instructions, stored on the one or more computer readable storage media devices to:

upload the updated video tutorial to a storage location of the video tutorial, wherein the updated video tutorial is available to be chosen as a replacement for the video tutorial.

6. The computer program product in accordance with claim 1, wherein the threshold condition is customizable and can include: a minimum number of users of the video tutorial that have performed the set of actions that are different than the set of actions displayed in the video tutorial, and a defined quantity of users of the video tutorial that have performed the set of actions that are different than the set of actions displayed in the video tutorial.

7. The computer program product in accordance with claim 1, wherein the video tutorial, the updated video tutorial, and the actions performed by users of the video tutorial are tagged with corresponding metadata that indicates the actions that are being shown or performed and associated time data.

8. A computer system for updating a video tutorial, the computer system comprising:

one or more computer processors;

one or more computer-readable storage media; and program instructions stored on the computer-readable storage media for execution by at least one of the one or more processors, the program instructions comprising:

program instructions to determine a number of users of a video tutorial that have performed a set of actions that are different than a set of actions displayed in the video tutorial;

program instructions to determine that the number of users of the video tutorial that have performed the set of actions that are different than the set of actions displayed in the video tutorial meets a threshold condition;

responsive to determining that the threshold condition is met, program instructions to identify a segment of the video tutorial to remove, wherein the identified segment includes the set of actions displayed in the video tutorial that are different; and program instructions to create an updated video tutorial by replacing the identified segment of the video tutorial with a video of the set of actions that are different than the set of actions displayed in the video tutorial.

9. The computer system of claim 8, wherein the program instructions to determine the number of users of the video tutorial that have performed the set of actions that are different than the set of actions displayed in the video tutorial, further comprise program instructions to:

receive actions performed by users of the video tutorial corresponding to actions displayed in the video tutorial, wherein the actions performed by the users of the video tutorial are being performed in response to viewing the video tutorial; and determine that the received actions include a set of actions that are different than a set of actions in the video tutorial, wherein the actions performed by the users of the video tutorial are recorded and stored with an association to the video tutorial.

10. The computer system of claim 8, wherein the performed set of actions and the set of actions displayed in the video tutorial correspond to performing the same function depicted in the video tutorial.

11. The computer system of claim 8, wherein the program instructions to create the updated video tutorial by replacing the identified segment of the video tutorial with the video of the set of actions that are different than the set of actions displayed in the video tutorial, further comprise program instructions to:

create a video clip of the performed set of actions that are different than the set of actions displayed in the video tutorial;

remove the identified segment of the video tutorial; and insert the created video clip into the video tutorial in place of the removed segment of the video tutorial.

12. The computer system of claim 8, further comprising program instructions to:

upload the updated video tutorial to a storage location of the video tutorial, wherein the updated video tutorial is available to be chosen as a replacement for the video tutorial.

13. The computer system of claim 8, wherein the threshold condition is customizable and can include: a minimum number of users of the video tutorial that have performed the set of actions that are different than the set of actions displayed in the video tutorial, and a defined quantity of users of the video tutorial that have performed the set of actions that are different than the set of actions displayed in the video tutorial.

* * * * *